United States Patent [19]

Muraki et al.

[11] Patent Number: 5,155,994
[45] Date of Patent: Oct. 20, 1992

[54] EXHAUST GAS PURIFICATION SYSTEM FOR AN INTERNAL COMBUSTION ENGINE

[75] Inventors: Hideaki Muraki, Nagoya; Kiyohiko Oishi, Toyota; Kenji Katoh, Shizuoka; Shinichi Takeshima, Susono, all of Japan

[73] Assignee: Toyota Jidosha Kabushiki Kaisha, Toyota, Japan

[21] Appl. No.: 823,184

[22] Filed: Jan. 21, 1992

[30] Foreign Application Priority Data

Jan. 22, 1991 [JP] Japan .................. 3-20351

[51] Int. Cl.$^5$ ................................ F01N 3/10
[52] U.S. Cl. .......................... 60/275; 60/278; 60/301; 422/171; 422/180; 422/190; 422/222; 423/213.7; 204/157.3
[58] Field of Search .................. 60/278, 298, 299, 301, 60/275; 422/189, 190, 191, 192, 193; 423/213.5, 213.7, 213.2, 235, 239; 204/157.3

[56] References Cited

U.S. PATENT DOCUMENTS

| | | |
|---|---|---|
| 3,953,576 | 3/1976 | Meguerian et al. ............ 60/301 |
| 4,076,606 | 2/1978 | Suzuki et al. ............ 204/157.43 |
| 4,104,360 | 8/1978 | Meguerian ............ 422/177 |
| 4,233,811 | 11/1980 | Masaki ............ 60/278 |
| 4,783,325 | 11/1988 | Jones ............ 422/177 |
| 4,978,514 | 12/1990 | Hofmann et al. ............ 423/239 |
| 5,041,270 | 8/1991 | Fugitani et al. ............ 423/213.7 |

FOREIGN PATENT DOCUMENTS

| | | | |
|---|---|---|---|
| 1-130735 | 5/1989 | Japan . | |
| 1-135541 | 5/1989 | Japan . | |
| 1-139145 | 5/1989 | Japan . | |
| 0163413 | 6/1989 | Japan ............ | 60/275 |

Primary Examiner—Ira S. Lazarus
Assistant Examiner—L. Heyman
Attorney, Agent, or Firm—Kenyon & Kenyon

[57] ABSTRACT

A noble metal base catalyst for decomposing a portion of NOx included in engine exhaust gas into intermediate products such as $N_2O$ and $NO_2$ is installed in an exhaust conduit of a lean burn engine. Further, an intermediate product decomposing means for decomposing the intermediate products produced by the noble metal base catalyst into $N_2$ and $O_2$ is installed downstream of the noble metal base catalyst. The noble metal base catalyst has a high thermal durability, and the noble metal base catalyst and the intermediate product decomposing means decompose NOx into $N_2$ and $O_2$ without a large amount of HC.

15 Claims, 4 Drawing Sheets

EXHAUST GAS PURIFICATION SYSTEM FOR AN INTERNAL COMBUSTION ENGINE

BACKGROUND OF THE INVENTION

1. Field of the Invention

The present invention relates to an exhaust gas purification system for an internal combustion engine which has a relatively high thermal durability and can decompose nitrogen oxides (NOx) included in exhaust gas from an engine to purify the exhaust gas.

2. Description of the Prior Art

Japanese Patent Publications No. HEI 1-130735 and No. HEI 1-135541 disclose a Cu-zeolite catalyst capable of reducing NOx in the presence of hydrocarbons (HC) under oxidizing gas conditions.

However, the Cu-zeolite catalyst has a drawback that the Cu-zeolite catalyst easily suffers a thermal degradation and lacks thermal durability. In addition, the Cu-zeolite catalyst needs a considerably large amount of HC to reduce NOx, and therefore requires a special HC supply device.

The research conducted by the inventors confirmed that a noble metal (for example, Pt) base catalyst (or a noble metal base series catalyst), which is known to have a relatively high thermal durability, can reduce NOx at relatively low temperatures and at lean air-fuel ratios.

Though the use of the noble metal base catalyst solves the thermal durability problem and the cost problem of a special HC supply device, it has been found by the inventors that intermediate products such as $N_2O$ and $NO_2$ are produced from a portion of the NOx included in the exhaust gas when the noble metal base catalyst is used at relatively low temperatures. Though $N_2O$ is harmless to a human body, $N_2O$ adds to the problem of global warming. Therefore, it is desirable to decompose $N_2O$ into nitrogen ($N_2$) and oxygen ($O_2$) as perfectly as possible.

SUMMARY OF THE INVENTION

An object of the invention is to provide an exhaust gas purification system for an internal combustion engine wherein NOx included in exhaust gas from an engine is reduced by a noble metal base catalyst, and intermediate products produced from a portion of the NOx in the reduction stage are decomposed into $N_2$ and $O_2$ as perfectly as possible.

The above-described object is achieved by an exhaust gas purification system for an internal combustion engine in accordance with the present invention, which includes: an internal combustion engine capable of fuel combustion at lean air-fuel ratios and having an exhaust conduit; a noble metal base catalyst installed in the exhaust conduit of the internal combustion engine for decomposing a portion of NOx included in exhaust gas from the internal combustion engine into $N_2$ and $O_2$ and for decomposing a remainder of the NOx into hetrogeneous intermediate products ($N_2O$, $NO_2$). The exhaust gas purification systemt further includes an intermediate product decomposing means, installed in a portion of the exhaust conduit of the internal combustion engine downstream of the noble metal base catalyst, for decomposing the hetrogeneous intermediate products into $N_2$ and $O_2$.

In the above-described exhaust gas purification system, the exhaust gas from the engine flows to the noble metal base catalyst, where a portion of NOx included in the exhaust gas is decomposed into $N_2$ and $O_2$ and the remaining portion of NOx is imperfectly decomposed into hetrogeneous intermediate products including $N_2O$ and $NO_2$. The intermediate products flow from the noble metal base catalyst to the intermediate product decomposing means, where the intermediate products are decomposed into $N_2$ and $O_2$. As a result, upon leaving the intermediate porduct decomposing means, the exhaust gas includes almost no intermediate products.

BRIEF DESCRIPTION OF THE DRAWINGS

The above-noted object and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
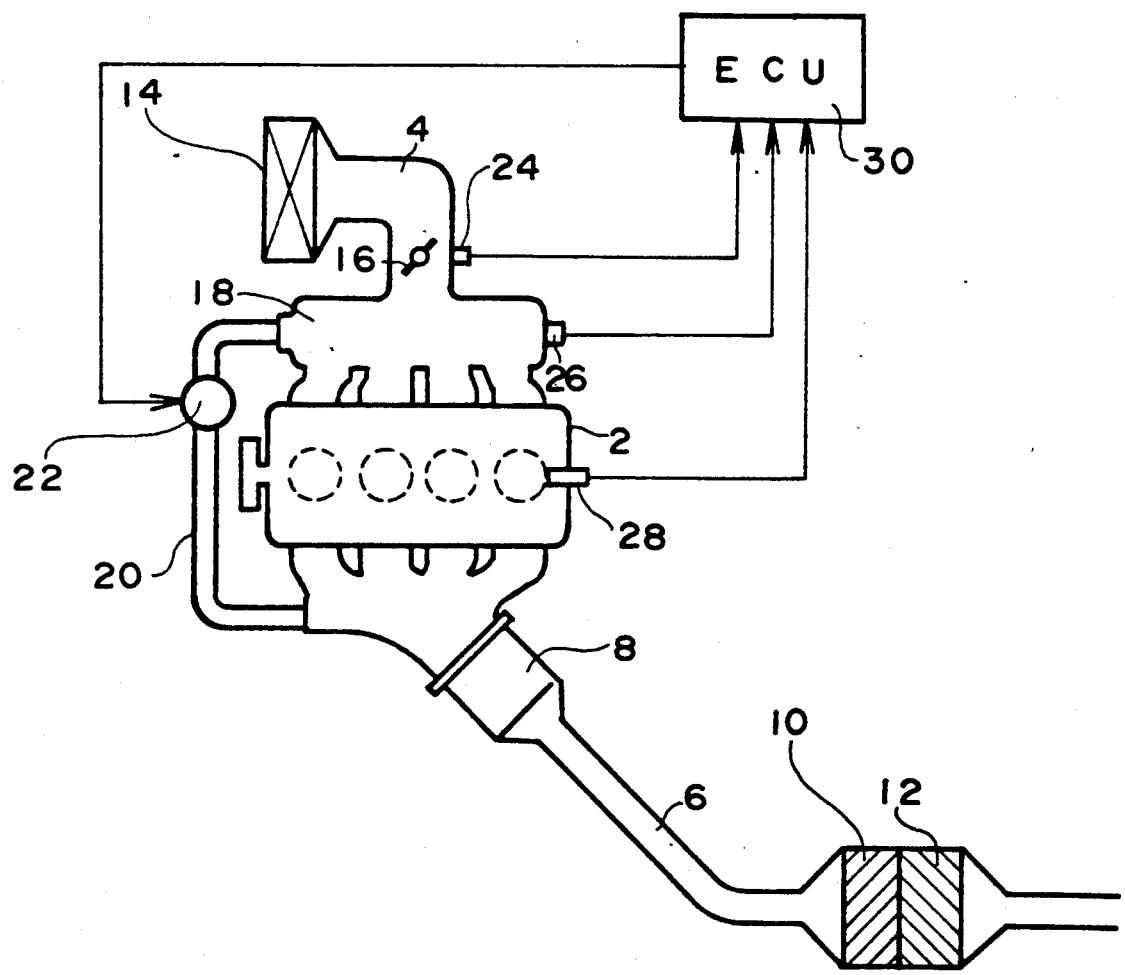
FIG. 1 is a schematic system diagram of an exhaust gas purification system for an internal combustion engine in accordance with a first embodiment of the present invention.
Figure 2:
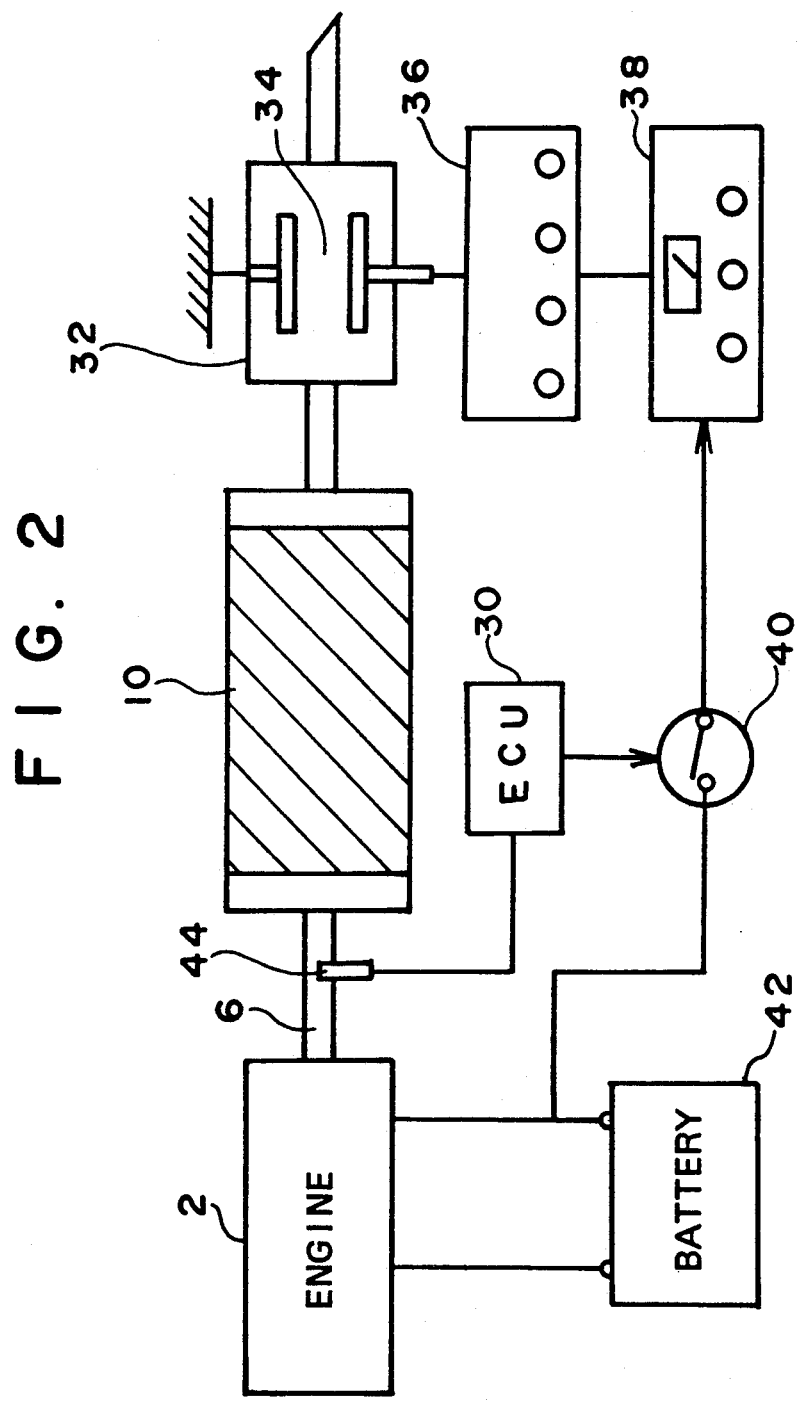
FIG. 2 is a schematic system diagram of an exhaust gas purification system for an internal combustion engine in accordance with a second embodiment of the present invention.

Three embodiments of the present invention will be explained. A system in accordance with the first embodiment is illustrated in FIG. 1. The first embodiment corresponds to a case where an intermediate product decomposing means includes a catalyst capable of decomposing $N_2O$ into $N_2$ and $O_2$. A system in accordance with the second embodiment is illustrated in FIG. 2. The second embodiment corresponds to a case where an intermediate product decomposing means includes a plasma device capable of decomposing $N_2O$ into $N_2$ and $O_2$. A system in accordance with the third embodiment is illustrated in FIGS. 3–6. The third embodiment corresponds to a case where an intermediate product decomposing means includes a catalyst capable of decomposing $NO_2$ into $N_2$ and $O_2$.

FIRST EMBODIMENT

As illustrated in FIG. 1, an exhaust gas purification system for an internal combustion engine includes an internal combustion engine 2 capable of fuel combustion at lean air-fuel ratios, the engine 2 having an intake conduit 4 and an exhaust conduit 6. A three-way catalyst 8 is installed as a start catalyst in an upstream portion of the exhaust conduit 6, and a noble metal base catalyst 10 is installed in a downstream portion, that is, a relatively low temperature portion of the exhaust conduit 6. The noble metal base catalyst 10 includes a monolithic carrier constructed of alumina ($Al_2O_3$) carrying platinum (Pt). A ferrite series zeolite catalyst (for example, Fe/ZSM-5) or a zeolite catalyst carrying $LaMnO_3$ is installed in the exhaust conduit 6 downstream of the noble metal base catalyst 10. This ferrite series zeolite catalyst or $LaMnO_3$ carrying zeolite catalyst constitutes an intermediate product decomposing means 12 in the first embodiment.

An air cleaner 14, a throttle valve 16, and a surge tank 18 are installed in the intake conduit 4 in that order in an intake air flow direction. An exhaust gas recirculation (EGR) conduit 20 is provided so as to connect the exhaust conduit 6 and the intake conduit 4, and an EGR valve 22 is installed in the EGR conduit 20. A throttle valve opening degree sensor 24 is coupled to the throttle valve 16, and an intake pressure sensor 26 is installed at the surge tank 18. Further, a combustion pressure detecting sensor 28 is provided to a combustion chamber of the engine. Signals from these sensors 24, 26, and 28 are fed to an electronic control unit (ECU) 30. ECU 30 includes a micro computer, where an optimum EGR valve opening degree is calculated in a central processor unit of the micro computer based on the current engine operating conditions detected by the above-described sensors, and output signals from the ECU 30 are sent to the EGR valve 22 to control the opening degree of the EGR valve 22.

Due to the EGR gas amount control, combustion of the engine can be controlled, and in turn, the air-fuel ratio and the exhaust gas temperature also can be controlled. More particularly, by control of the EGR the oxygen concentration of the exhaust gas at the position of the noble metal base catalyst 10 and the catalyst temperature can be controlled so that a high NOx purification rate of the noble metal base catalyst 10 is obtained. Therefore, the ECU 30 and the EGR valve 22 constitute a control means for controlling the exhaust gas condition and the catalyst temperature of the noble metal base catalyst 10. More particularly, when the EGR gas amount is increased, an exhaust gas which includes little oxygen is recirculated into the intake conduit, so that the exhaust gas condition is made lean and the engine combustion is degraded to lower the exhaust gas temperature.

In the first embodiment, for the purpose of promoting reduction of NOx, the noble metal base catalyst 10 is controlled to a relatively low temperature, for example, about 300° C. The noble metal base catalyst 10 can show an excellent NOx reduction characteristic at low temperatures as compared to high temperatures. However, the noble metal base catalyst 10 produces a considerably large amount of $N_2O$ as intermediate products at low temperatures rather than at high temperatures. The $N_2O$ produced flows from the noble metal base catalyst 10 to the intermediate product decomposing means 12 where the $N_2O$ is decomposed into $N_2$ and $O_2$, so that NOx can be substantially perfectly purified.

Next, test results of the exhaust gas purification system in accordance with the first embodiment will be explained.

(a) TEST 1

A ZSM-5 (zeolite) catalyst carrying Fe by ion exchanging was installed downstream of an exhaust gas purification catalyst of an automobile, and a decreasing rate of $N_2O$ was measured.

Test Condition:

engine: 2 liters, 1,200 rpm, 40 Nm, A/F (air-fuel ratio=20)
exhaust gas purification catalyst: Pt/Rh/Ce/Alumina,
1.7 liter monolithic catalyst,
temperature=300° C.
intermediate product decomposing catalyst: Fe/ZSM-5, 1.3 liter monolithic catalyst,
temperature=300° C.
Test results:
The $N_2O$ concentration was measured at upstream and downstream positions of the intermediate product decomposing catalyst 12.
$N_2O$ concentration at the upstream position of the catalyst was 64 ppm.
$N_2O$ concentration at the downstream position of the catalyst was 1 ppm. (purification rate=98%)

(b) TEST 2

Test 2 was executed using a zeolite monolithic catalyst carrying $LaMnO_3$ as the intermediate product decomposing catalyst 12. The other conditions of the test were kept to the same conditions as those of TEST 1.
Test results:
The $N_2O$ concentration was measured at upstream and downstream positions of the intermediate product decomposing catalyst 12.
$N_2O$ concentration at the upstream position of the catalyst was 64 ppm.
$N_2O$ concentration at the downstream position of the catalyst was 5 ppm. (purification rate=92%)

As understood from the above results, a high NOx purification rate can also be obtained under the conditions of TEST 2.

SECOND EMBODIMENT

FIG. 2 illustrates a system diagram of the second embodiment. Members corresponding to those of the first embodiment are denoted with the same reference numerals as those of the first embodiment.

In FIG. 2, an internal combustion engine 2 capable of lean fuel combustion has an exhaust conduit 6. A noble metal base catalyst 10 is installed in a relatively low temperature (about 300° C.) portion of the exhaust conduit 6, and an ECU 30 is provided as in the first embodiment.

The noble metal base catalyst 10 includes an alumina monolithic carrier carrying noble metal such as Pt (for example, a three-way catalyst) or a zeolite monolithic carrier carrying noble metal such as Pt (a Pt series zeolite catalyst).

An intermediate product decomposing means 32 which includes a plasma device for decomposing $N_2O$ produced by the noble metal base catalyst 10 into $N_2$ and $O_2$ is installed in a portion of the exhaust conduit 6 downstream of the noble metal base catalyst 10. This plasma device 32 includes a pair of plasma electrodes 34 discharging electricity into the exhaust gas, a plasma generator 36 intermittently imposing a plasma generating voltage on the plasma electrodes 34, an RF generator 38 connected to the plasma generator 36 and converting the electric current from the battery 42 to an electric voltage applicable to the plasma generator 36, and a switch 40 provided in an electric circuit connecting the battery 42 and the RF generator 38. The switch 40 is operated in accordance with the instructions from the ECU 30. An output signal from a temperature sensor 44, which detects an inlet gas temperature of the noble metal base catalyst 10, is fed to the ECU 30.

Because little $N_2O$ is produced by the noble metal base catalyst 10 at high temperatures, the switch 40 is turned off according to the instruction from the ECU 30 when the exhaust gas temperature is higher than 300° C. Therefore, plasma discharge is not needed to be generated for these temperatures. The switch 40 is turned on in accordance with the instruction from the ECU 30 when the exhaust gas temperature is at about 300° C.

In the second embodiment, the noble metal base catalyst 10 reduces NOx at low temperatures and, at the same time, $N_2O$ is produced. At the low temperatures, the plasma device 32 discharges electricity to decompose $N_2O$ into $N_2$ and $O_2$. When the noble metal base catalyst 10 is at high temperatures, little $N_2O$ is produced and plasma discharge is stopped. As a result, almost all NOx is finally decomposed into $N_2$ and $O_2$ in the second embodiment.

THIRD EMBODIMENT

Figure 3:
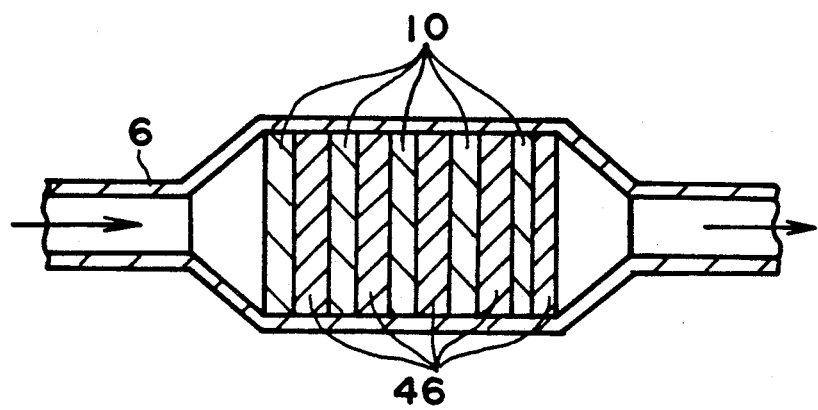
FIG. 3 is a cross-sectional view of a catalyst portion of an exhaust gas purification system for an internal combustion engine in accordance with a third embodiment of the present invention.

FIG. 3 illustrates a catalyst assembly portion of an exhaust gas purification system for an internal combustion engine in accordance with the third embodiment of the present invention. In the third embodiment, at least one combination of a noble metal base catalyst 10 and an intermediate product decomposing means 46 is disposed in the exhaust conduit.

The noble metal base catalyst 10 includes a catalyst having a carrier which is constructed of an oxide selected from the group consisting of alumina, titania, and zirconia and carries Pt. The intermediate product decomposing means 46 includes a catalyst which decomposes $NO_2$ into $N_2$ and $O_2$. More particularly, the intermediate product decomposing means 46 includes a zeolite which carries metal selected from the group consisting of Cu and Fe.

The at least one combination of the noble metal base catalyst 10 and the intermediate product decomposing catalyst 46 is disposed at a relatively upstream portion of the exhaust conduit 6. The exhaust gas purification system further includes an EGR system. When the exhaust gas temperature is high, the EGR system is operated so as to decrease the oxygen concentration in the exhaust gas.

The NOx decomposition mechanism of the exhaust gas purification system in accordance with the third embodiment is as follows:

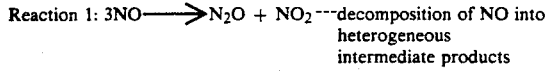

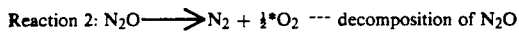

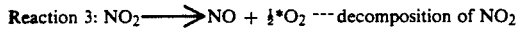

More particularly, NOx included in the exhaust gas of the lean burn engine usually takes the form of NO when the exhaust gas temperature is at above 300° C. A portion of NO is directily decomposed into $N_2$ and $O_2$ by the noble metal base catalyst 10, and a remaining portion of NO is decomposed by the noble metal base catalyst 10 into $N_2O$ and $NO_2$ in accordance with the above-described Reaction 1. The $N_2O$ thus produced is further decomposed into $N_2$ and $O_2$ by the noble metal base catalyst 10 in accordance with the above-described Reaction 2. The $NO_2$ produced at the noble metal base catalyst 10 flows to the intermediate product decomposing catalyst 46 where the $NO_2$ is decomposed into $N_2$ and $O_2$ by the intermediate product decomposing catalyst 46 in accordance with the above-described Reaction 3. When these reactions 1, 2, and 3 are completed, the whole amount of NO included in the exhaust gas is finally decomposed into $N_2$ and $O_2$. Therefore, it can be understood that NOx included in the engine exhaust gas is effectively decomposed into $N_2$ and $O_2$, using a combination of the noble metal base catalyst 10 and the intermediate product decomposing catalyst 46 for decomposing $NO_2$. By combining the noble metal base catalyst 10 and the intermediate product decomposing catalyst 46 in a plurality of stages as shown in FIG. 3, the above-described reactions are repeated, so that NOx included in the engine exhaust gas is substantially perfectly purified.

The reason why the combination of the catalysts 10 and 46 should be installed at the upstream portion of the exhaust conduit 6 and the reason why the EGR gas should be introduced when the exhaust gas temperature is high will now be explained.

When the exhaust gas temperature is high and the oxygen concentration is high (the air-fuel ratio value is large), not only the above-described Reaction 1 but also oxidation of NO (Reaction 1' shown below) occurs. When the oxidation of NO is promoted, the decomposition of NO is suppressed as will be understood from the following reactions:

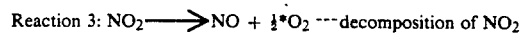

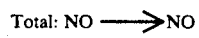

Thus, the above-described Reaction 1' suppresses the purification of NOx at high temperatures.

Figure 4:
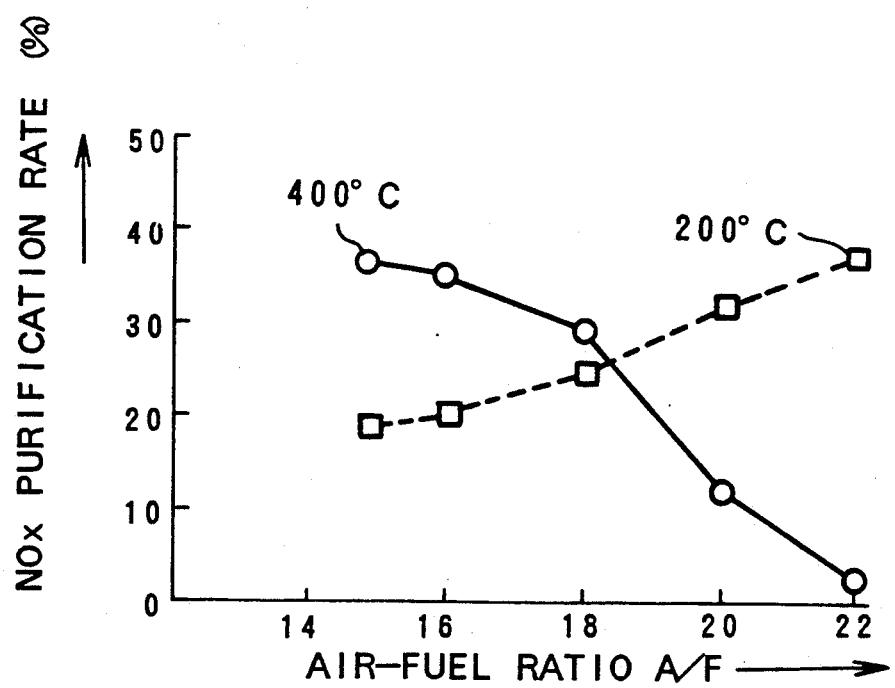
FIG. 4 is a graphical representation of a NOx purification rate versus air-fuel ratio characteristic of a noble metal base catalyst.

FIG. 4 illustrates NOx purification rate versus air-fuel ratio characteristics at 200° C. and 400° C., of the noble metal base catalyst of the third embodiment. From FIG. 4, it is understood that though the NOx purification rate of the catalyst is high at lean air-fuel ratios at approximately 200° C., the NOx purification rate of the catalyst is decreased at the lean air-fuel ratios at approximately 400° C. This is because the above-described Reaction 1' is promoted at high temperatures. Therefore, it is desirable to use the catalyst at low temperatures, for example, at about 200° C.

Figure 5:
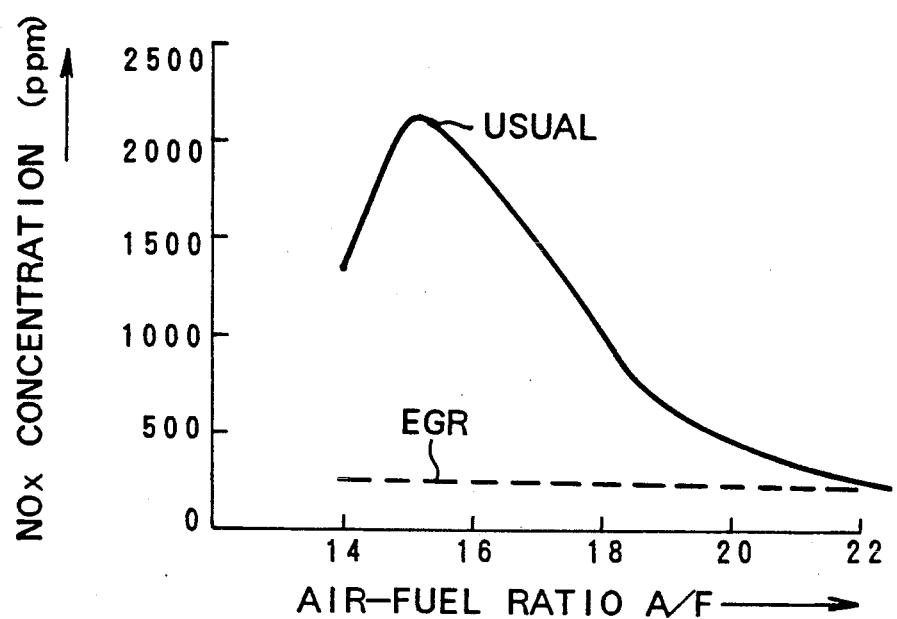
FIG. 5 is a graphical representation of a NOx concentration versus air-fuel ratio characteristic of a lean burn engine.

FIG. 5 illustrates NOx exhaust characteristic of the lean burn engine. As understood from FIG. 5, in a usual operation in which the EGR gas is not introduced, the amount of NOx exhausted from the engine reaches a maximum value when the air-fuel ratio is at about 17. So, it is undesirable to operate the engine at air-fuel ratios near the air-fuel ratio 17, though the NOx purification rate of the catalyst is high at 400° C. (see FIG. 4). Thus, it would be desirable to use the engine at lean air-fuel ratio far from the ratio 17 and to use the noble metal base catalyst 10 at low temperatures (that is, to locate the catalyst 10 at the downstream portion of the exhaust conduit) so that NOx exhaust to the atmosphere is suppressed.

Figure 6:
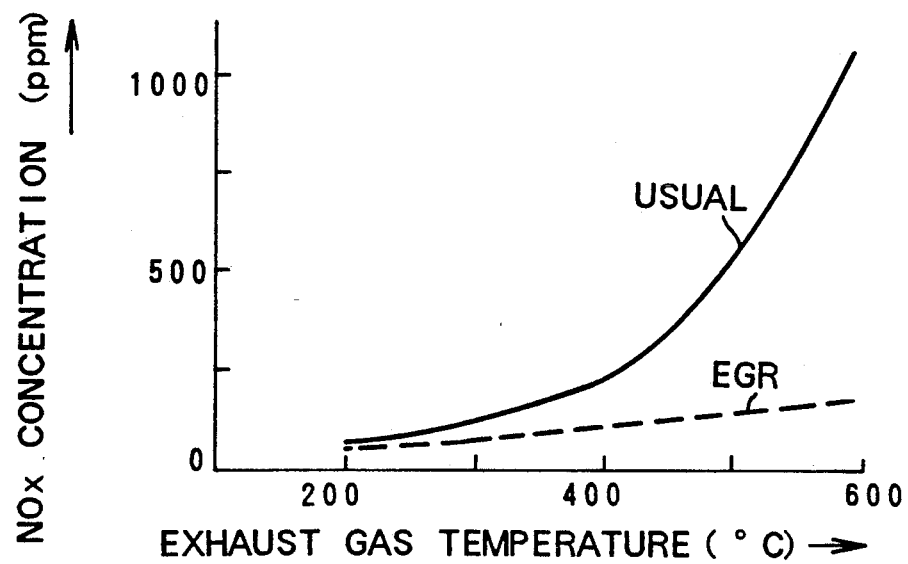
FIG. 6 is a graphical representation of a NOx concentration versus exhaust gas temperature characteristic of a lean burn engine.

However, in the case where the catalyst is located in the downstream portion of the exhaust conduit 6, it is difficult to yield the high NOx purification rate requested by the exhaust purification regulation, because the purification rate of the catalyst is degraded (the activity of the catalyst itself is lost) at low engine speeds (at very low temperatures below 180° C.). In order to solve these problems, it is determined in the third embodiment that the at least one combination of the catalyst 10 and 46 should be disposed in a relatively upstream portion of the exhaust conduit to prevent the catalyst temperature from being lowered to a temperature below 180° C. even at low engine speeds, and that when the exhaust gas temperature increases, the EGR gas is introduced into the intake conduit so that the oxygen concentration of the exhaust gas is decreased to suppress the above-described oxidation Reaction 1'. By introducing EGR gas into the intake conduit of the engine, the NOx exhaust amount is suppressed from the characteristic of the usual operation without EGR shown by a full line in FIG. 5 to the characteristic with EGR shown by a broken line in FIG. 5, and the NOx exhaust amount is greatly decreased. FIG. 6 illustrates how the NOx exhaust amount is decreased in the exhaust gas purification system in accordance with the third embodiment when the EGR gas is introduced into the intake conduit of the engine, compared with the case of usual operation without EGR.

Since the NOx decomposition or purification is promoted due to the EGR execution even without HC in the third embodiment, an additional HC oxidation catalyst can be installed in a portion of the exhaust conduit upstream of the noble metal base catalyst, so that the severe HC purification regulation can be easily satisfied. In this instance, if the noble metal base catalyst 10 needed a large amount of HC to decompose NOx, it would not be allowed to install an HC oxidation catalyst upstream of the noble metal base catalyst 10.

In accordance with any embodiment of the present invention, the following advantages are obtained. (a) Since the noble metal base catalyst 10 is superior to a Cu-zeolite catalyst in thermal durability, the durability of the exhaust gas purification system is improved. (b) Since the noble metal catalyst 10 and the intermediate product decomposing means 12, 32, and 46 do not need a large amount of HC to purify NOx, unlike the conventional Cu-zeolite catalyst, it is not necessary to provide a special HC source or HC injection device, and therefore the exhaust gas purification system has an advantage from the viewpoint of cost.

Although a few embodiments of the present invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An exhaust gas purification system for an internal combustion engine comprising:
   an internal combustion engine capable of fuel combustion at lean air-fuel ratios and having an exhaust conduit;
   a noble metal base catalyst, installed in the exhaust conduit of the internal combustion engine, for decomposing a portion of NOx included in exhaust gas from the internal combustion engine into $N_2$ and $O_2$ and decomposing a remainder of the NOx into intermediate products including $N_2O$ and $NO_2$; and
   intermediate product decomposing means, installed in the exhaust conduit of the internal combustion engine downstream of the noble metal base catalyst, for decomposing the intermediate products into $N_2$ and $O_2$.

2. An exhaust gas purification system for an internal combustion engine according to claim 1, wherein the intermediate product decomposing means comprises a catalyst decomposing $N_2O$ into $N_2$ and $O_2$.

3. An exhaust gas purification system for an internal combustion engine according to claim 2, wherein the noble metal base catalyst comprises a monolithic carrier constructed of $Al_2O_3$ carrying Pt, and the intermediate product decomposing means comprises an Fe/ZSM-5 catalyst.

4. An exhaust gas purification system for an internal combustion engine according to claim 2, wherein the noble metal base catalyst comprises a monolithic carrier constructed of $Al_2O_3$ carrying Pt, and the intermediate product decomposing means comprises a zeolite catalyst carrying $LaMnO_3$.

5. An exhaust gas purification system for an internal combustion engine according to claim 2, further comprising an EGR system and an ECU for controlling the EGR system so that a temperature of the noble metal base catalyst is controlled to about 300° C.

6. An exhaust gas purification system for an internal combustion engine according to claim 1, wherein the intermediate product decomposing means comprises plasma means for discharging electricity to decompose $N_2O$ into $N_2$ and $O_2$.

7. An exhaust gas purification system for an internal combustion engine according to claim 6, wherein the noble metal base catalyst comprises a three-way catalyst.

8. An exhaust gas purification system for an internal combustion engine according to claim 6, wherein the noble metal base catalyst comprises a zeolite monolithic carrier carrying Pt.

9. An exhaust gas purification system for an internal combustion engine according to claim 6, wherein the plasma means comprises a pair of plasma electrodes for discharging electricity into the exhaust gas from the engine, a plasma generator for imposing intermittently a plasma voltage on the plasma electrodes, a battery electrically connected to the plasma generator, and a switch provided between the battery and the plasma generator.

10. An exhaust gas purification system for an internal combustion engine according to claim 9, wherein the switch is turned on when an exhaust gas temperature is at about 300° C. and the switch is turned off when the exhaust gas temperature is at a temperature far from and above 300° C.

11. An exhaust gas purification system for an internal combustion engine according to claim 1, wherein the intermediate product decomposing means comprises a catalyst for decomposing $NO_2$ into $N_2$ and $O_2$.

12. An exhaust gas purification system for an internal combustion engine according to claim 11, wherein the noble metal base catalyst comprises a catalyst constructed of an oxide selected from the group consisting of alumina, titania, and zirconia and carrying Pt.

13. An exhaust gas purification system for an internal combustion engine according to claim 11, wherein the intermediate product decomposing means comprises a zeolite carrying metal selected from the group consisting of Cu and Fe.

14. An exhaust gas purification system for an internal combustion engine according to claim 11, wherein at least one combination of the noble metal base catalyst and the intermediate product decomposing means is installed in a relatively upstream portion of the exhaust conduit of the internal combustion engine.

15. An exhaust gas purification system for an internal combustion engine according to claim 11, wherein a plurality of combinations of the noble metal base catalyst and the intermediate product decomposing means are installed in the exhaust conduit of the internal combustion engine.

* * * * *